(12) United States Patent
Tu

(10) Patent No.: US 7,484,019 B2
(45) Date of Patent: Jan. 27, 2009

(54) EXPANSION SYSTEM THAT AUTOMATICALLY ALLOWS OR BLOCKS DATA FROM THE PLC HOST USING A CLAMPING AND DECODING CIRCUIT TO OUTPUT CLAMPING VALUE

(75) Inventor: Chun-Yen Tu, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 473 days.

(21) Appl. No.: 11/297,452

(22) Filed: Dec. 9, 2005

(65) Prior Publication Data

US 2007/0239907 A1     Oct. 11, 2007

(51) Int. Cl.
*G06F 13/12* (2006.01)
*G06F 13/38* (2006.01)
*G06F 3/00* (2006.01)
*G06F 13/00* (2006.01)

(52) U.S. Cl. ............... 710/62; 710/1; 710/2; 710/100; 710/300

(58) Field of Classification Search ............ 710/62
See application file for complete search history.

(56) References Cited

U.S. PATENT DOCUMENTS

| | | | |
|---|---|---|---|
| 5,862,405 A * | 1/1999 | Fukuda et al. ............... 710/9 |
| 6,286,060 B1 * | 9/2001 | DiGiorgio et al. ............ 710/31 |
| 6,418,499 B1 * | 7/2002 | Korowitz et al. ............ 710/301 |
| 6,812,871 B2 * | 11/2004 | Wu ............................. 341/99 |
| 6,816,915 B1 * | 11/2004 | Packer ......................... 710/2 |
| 2002/0178314 A1 * | 11/2002 | Cho ............................ 710/300 |
| 2007/0118673 A1 * | 5/2007 | Wang et al. ................. 710/305 |

* cited by examiner

*Primary Examiner*—Niketa I Patel
*Assistant Examiner*—Brooke J Dews

(57) ABSTRACT

A serial-connection and parallel-communication fast interface for a PLC host and an expansion device includes a PLC host, at least one expansion device and shared bus comprising address lines, data lines, control lines and I/O addressing lines. The PLC host comprises an initial address output circuit and outputting a clamping value to the expander through an output addressing line. The expansion device includes a microprocessor, a memory unit and a clamping and decoding circuit such that the expansion device can automatically allocate the order thereof and output the clamping value through the addressing line. The expansion device can automatically allow or block the data from the PLC host. Therefore, the problem of overlong communication time for data access, the augmentation of expansion device and order limitation can be saved.

13 Claims, 6 Drawing Sheets

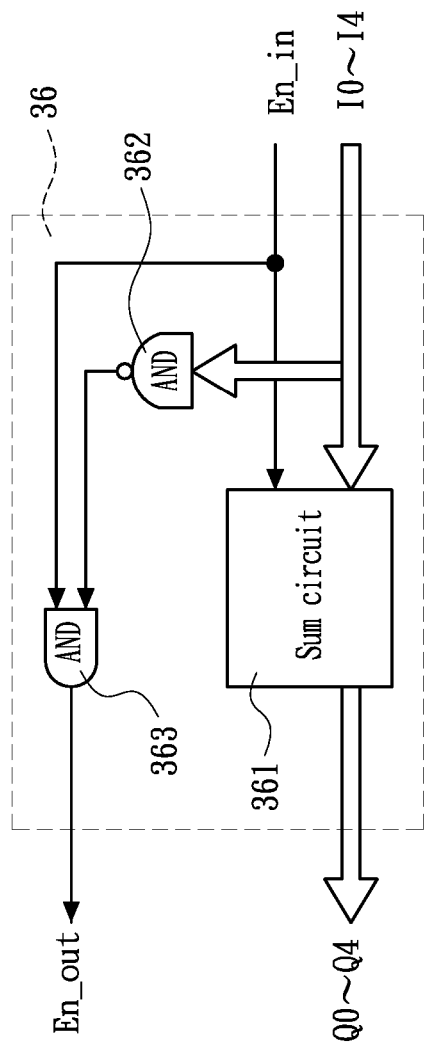
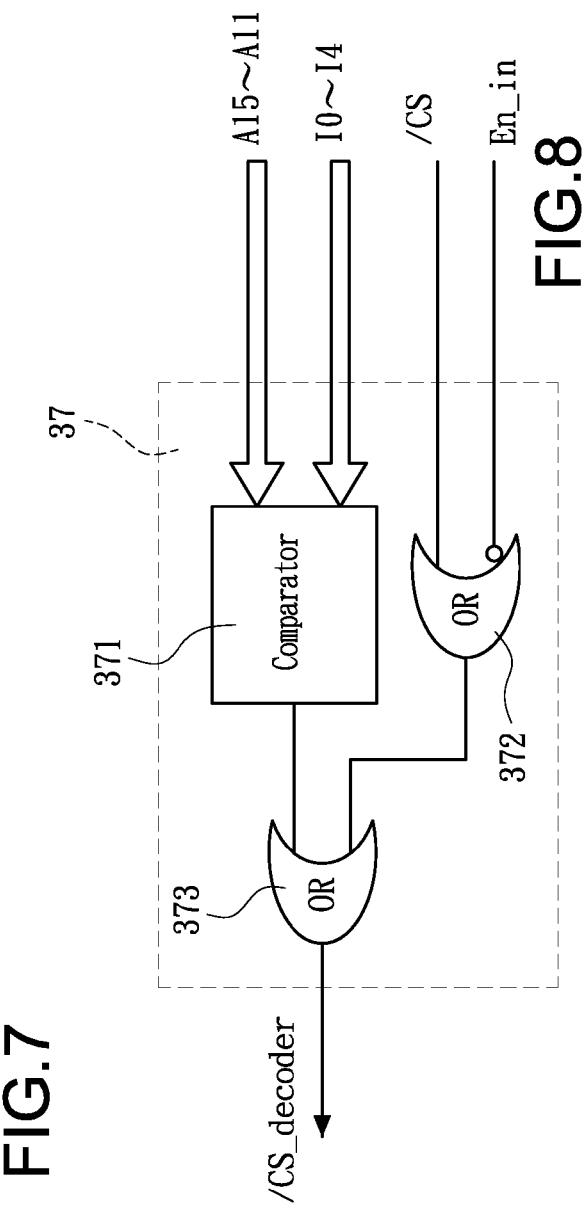

EXPANSION SYSTEM THAT AUTOMATICALLY ALLOWS OR BLOCKS DATA FROM THE PLC HOST USING A CLAMPING AND DECODING CIRCUIT TO OUTPUT CLAMPING VALUE

BACKGROUND OF THE INVENTION

1. Field of the Invention

The present invention relates to serial-connection and parallel-communication fast interface for PLC host and expansion device, especially relates to serial-connection and parallel-communication fast interface for PLC host and expansion device, wherein the expansion device can be optionally and flexibly added with unlimited order and the accessing time can be reduced.

2. Description of Prior Art

The programmable logic-controller (PLC) is generally connected to external equipments or devices through the external I/O terminals thereof and controls the external equipments or devices by editing a program thereof. However, the prior art PLC has external I/O terminals with predetermined pin counts and expansion device is need to expand analog or digital pin counts when the prior art PLC is to be connected to more external equipments or devices.

The prior art PLC is generally connected to expansion device through serial-connection-serial-communication or parallel-connection-parallel-communication. For PLC in serial-connection-serial-communication with the expansion device, the PLC is serially connected to a plurality of expansion devices. When the PLC sends a data-accessing signal for a designated expansion device, each of the expansion devices will receive and process the data accessing signal to examine whether it is the designated expansion device. However, the communication time for the PLC to access the expansion device will be excessively long.

FIGS. 1 and 2 show the schematic diagram for the prior art PLC in parallel-connection-parallel-communication with expansion device. The PLC is connected through a fixed base 1 and a plurality of connectors 11 with decoding function. The connectors 11 are connected to the bus 15 of the fixed base 1 and comprise address lines, data lines and control lines, whereby the PLC host 12 is connected to a plurality of expansion devices 13 and 14 in parallel fashion. The connector 11 provides decoding function to reduce the communication time for the PLC to access the expansion device. However, the connector 11 has decoding function with fixed order and it places limitation on arrangement order of the expansion devices 13 and 14. The order of the expansion devices 13 and 14 cannot be changed. The fixed base 1 and a plurality of connectors 11 are needed even when the PLC host 12 is connected to one or just a few of expansion devices 13.

SUMMARY OF THE INVENTION

The present invention is to provide a serial-connection and parallel-communication interface for a PLC host and at least one expansion device. The serial-connection and parallel-communication interface comprises address lines, data lines, control lines and I/O addressing lines of a shared bus connected between the PLC host and the expansion device. The expansion device uses a built-in decoder to automatically allow or prohibit the PLC host for accessing data. The expansion device can be optionally added and the accessing speed can be enhanced.

Accordingly the serial-connection and parallel-communication interface for a PLC host comprises:

a PLC host;

a shared bus comprising address lines, data lines, control lines and I/O addressing lines and built in the PLC host;

a first microprocessor connected to the address lines, data lines, and control lines of the shared bus; and an initial address output circuit connected to the I/O addressing lines for outputting a clamping value to the expansion device;

a connector unit for connected to the serially connected expansion device;

an IRQ signal input for receiving the interrupt signal from the expansion device;

at least one expansion device comprising:

a microprocessor;

a memory unit comprising dual-port connector and connected to the address lines, data lines, and control lines of the first microprocessor, and the address lines, data lines, and control lines of the shared bus;

an input enable level signal connected to the output enable level signal of the PLC host or the expansion device of previous stage;

an output enable level signal as an input enable level signal of the expansion device of next stage;

an IRQ signal for sending interrupt signal to the PLC host; and a clamping and decoding circuit connected to the output addressing lines to get the clamping value of the expansion device of previous stage and converting the clamping value for sending to the expansion device of next stage through output addressing lines, the clamping and decoding circuit deciding whether the PLC host is connected to the memory unit and the data lines are activated for data accessing according to the clamping value from the input addressing lines.

The expansion device comprises a first connector and a second connector for connecting to the PLC host and the adjacent expansion device.

The PLC host and the expansion device are connected in a serial-connection and parallel-communication manner, which is established by address lines, data lines, control lines and I/O addressing lines of a shared bus connected between the PLC host and the expansion device. The expansion device automatically assign the order thereof and automatically allows or prohibits data accessing of the PLC host according to clamping values sent through the I/O addressing lines.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 7 shows a detailed circuit diagram of the clamping circuit of the present invention.

FIG. 8 shows a detailed circuit diagram of the decoding circuit of the present invention.

DETAILED DESCRIPTION OF THE INVENTION

Figure 1:
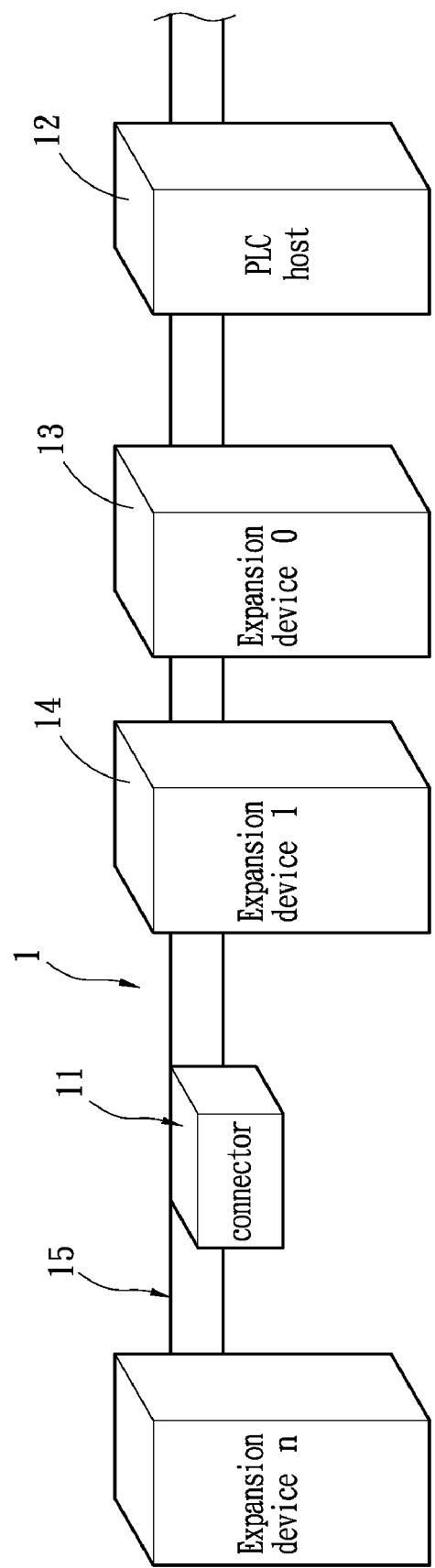
FIG. 1 shows the schematic diagram for the prior art PLC in parallel-connection and parallel-communication with expansion device.
Figure 2:
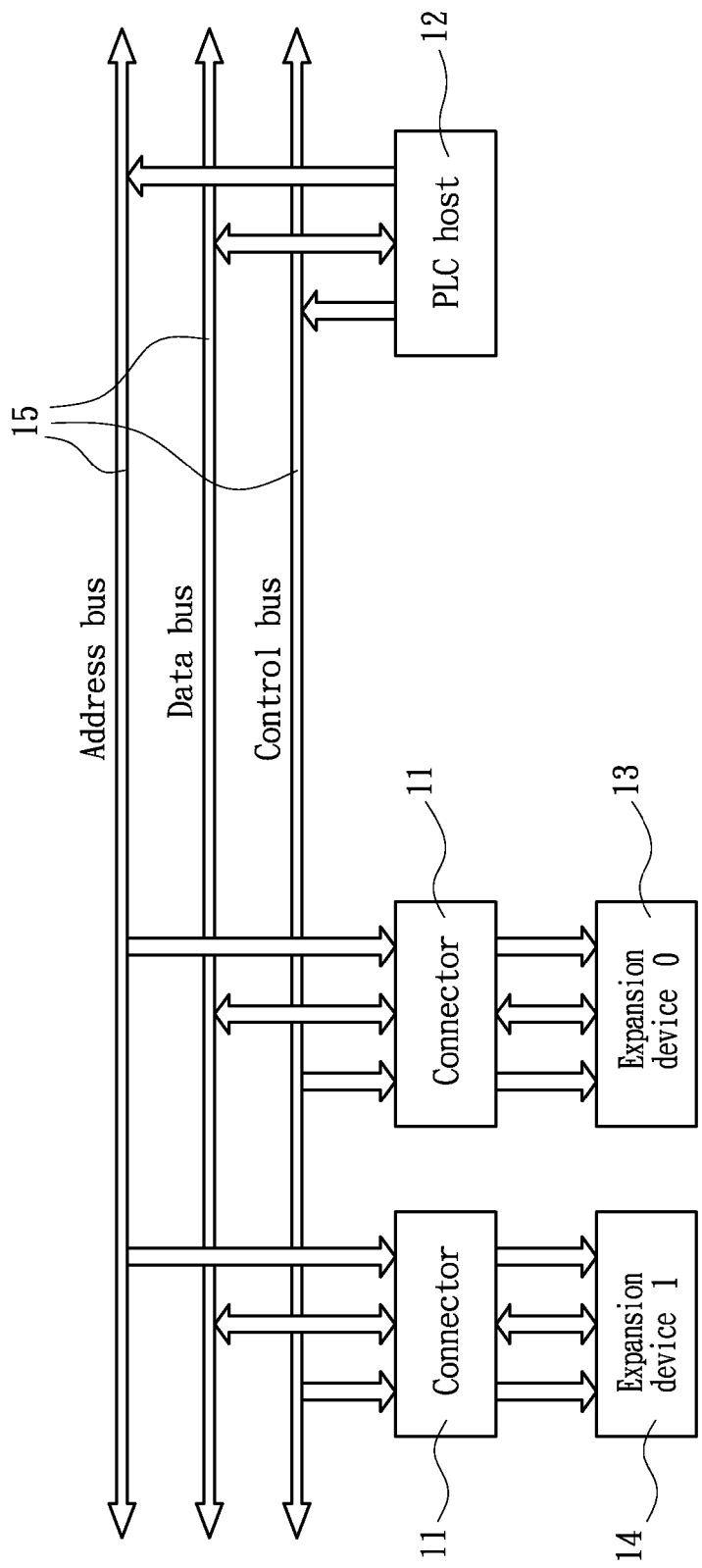
FIG. 2 shows the circuit diagram for the prior art PLC in parallel-connection and parallel-communication with expansion device.
Figure 3:
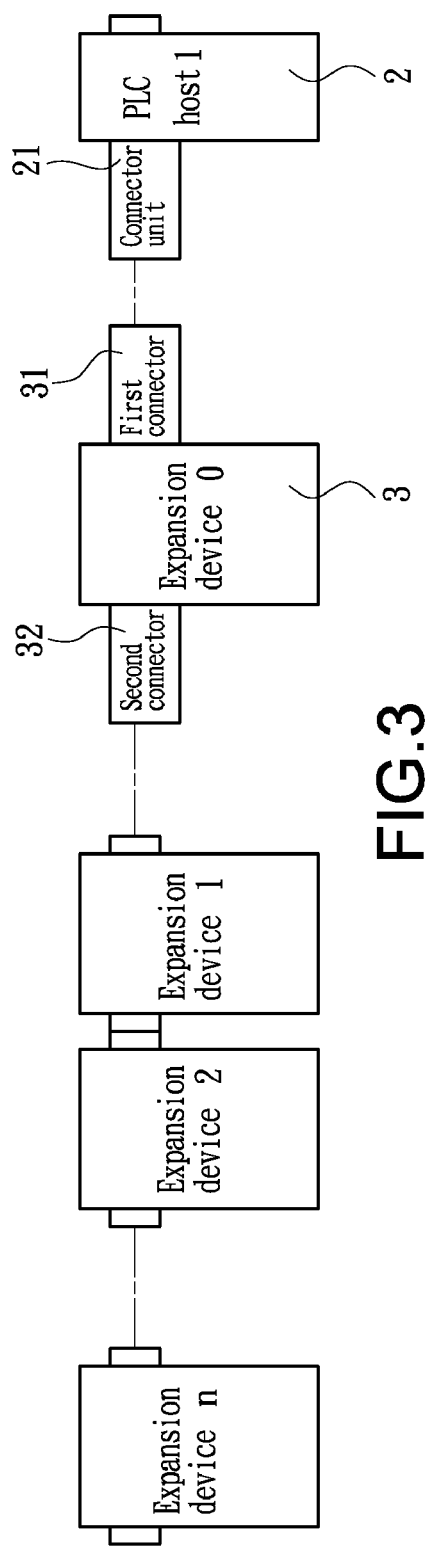
FIG. 3 shows a block diagram of the present invention.
Figure 4:
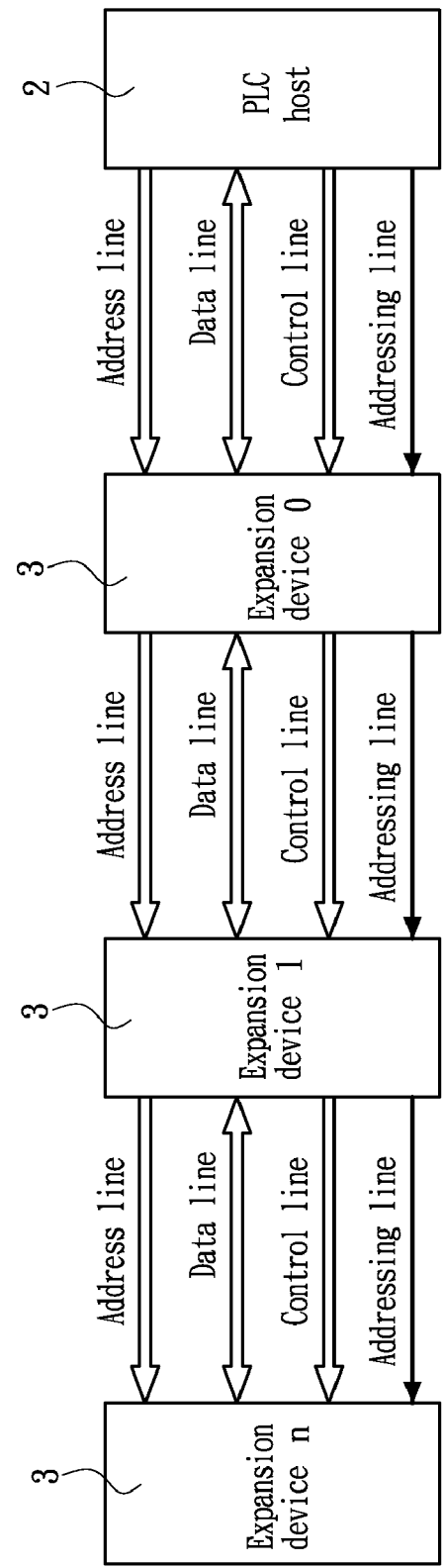
FIG. 4 shows a circuit diagram of the present invention.
Figure 5:
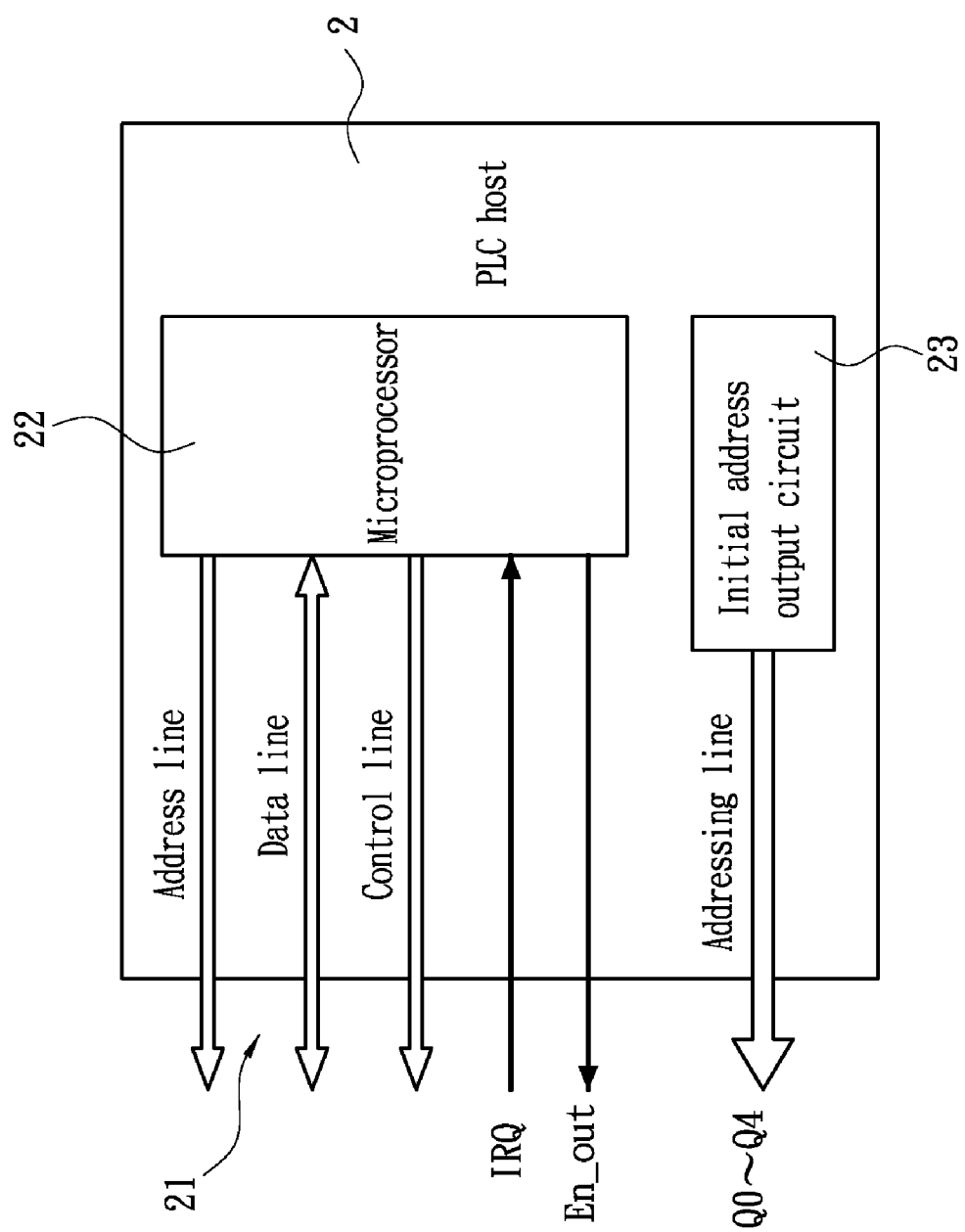
FIG. 5 shows a detailed circuit diagram of the PLC host of the present invention.
Figure 6:
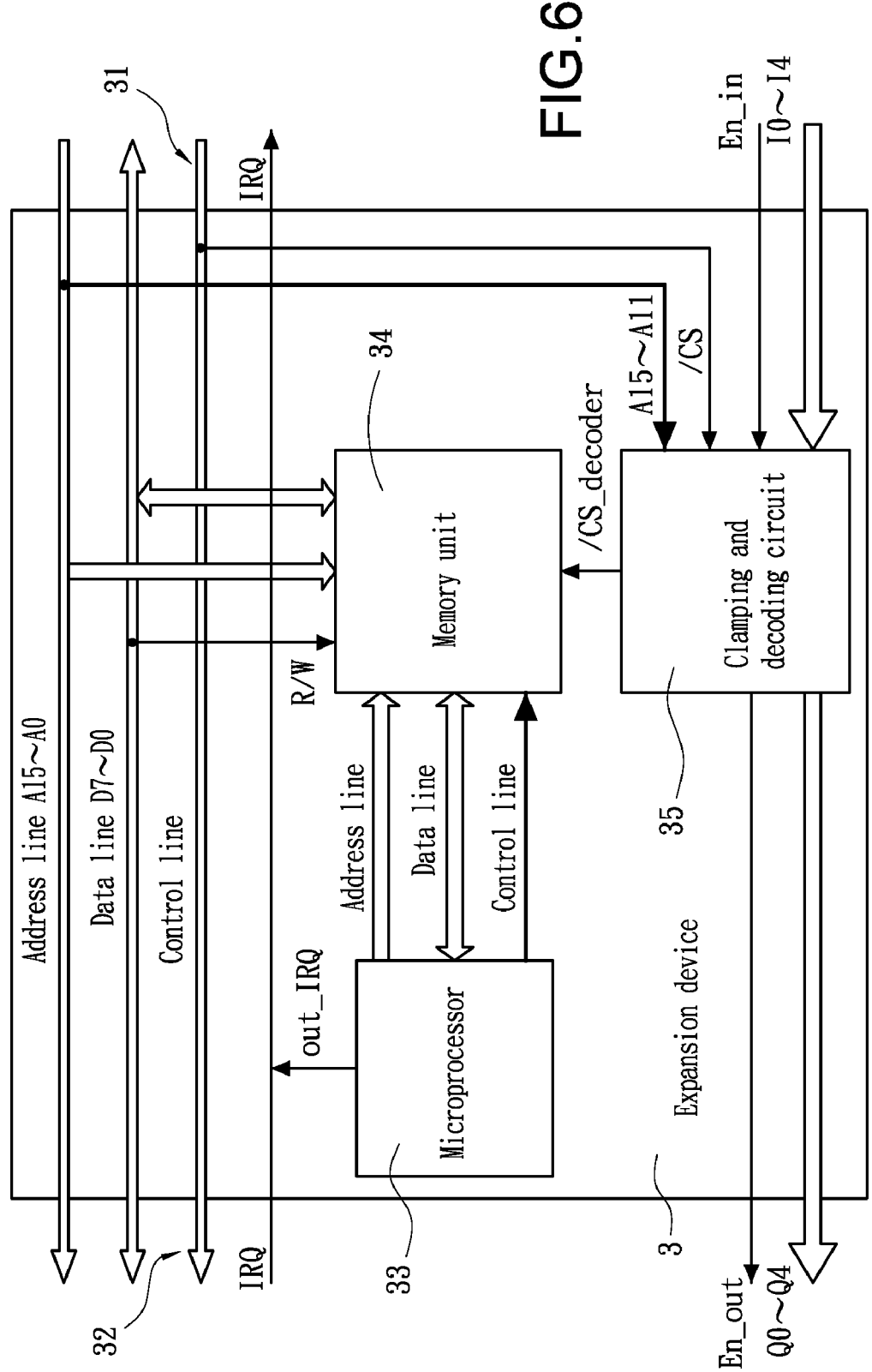
FIG. 6 shows a detailed circuit diagram of the expansion device of the present invention.

With reference to FIGS. 3 to 8, the present invention provides a fast communication interface for serial-connection-parallel-communication PLC host and expansion devices. The fast communication interface for PLC host and expansion devices comprises a PLC host 2 and at least one expansion device 3 connected with the PLC host 2. A connector unit 21 outside the PLC host 2 is connected to the expansion device 3. A first connector 31 and a second connector 32 are provided outside each expansion device 3. The first connector 31 of an expansion device 3 is connected to the connector unit 21 of the PLC host 2, or connected to the second connector 32 of a next expansion device 3. The second connector 32 of an expansion device 3 is connected to the first connector 31 of a next expansion device 3. Therefore, serial-connection and parallel-communication connection can be established between the PLC host 2 and at least one expansion device 3 with address lines, data lines, control lines I/O addressing lines therebetween.

The connector unit 21 of the PLC host 2 is one of a female connector unit or a male connector unit. The first connector 31 of the expansion device 3 is one of a male connector or a female connector, which is connectable to the connector unit 21 of the PLC host 2. The second connector 32 of the expansion device 3 is one of a female connector or a male connector, which is connectable to the first connector 31 of the next expansion device 3.

The internal circuit in the PLC host 2 comprises built-in standard shared bus with address lines, data lines, control lines and output addressing lines Q0-Q4, a microprocessor 22 and an initial address output circuit 23. The microprocessor 22 is connected to the address lines, data lines, and control lines in the standard shared bus for sending data and control signals. The microprocessor 22 comprises an output enable level signal pin En_out for sending a high-level signal for enabling and an IRQ signal pin. The initial address output circuit 23 has constant output of 0 or other value and sends its output through the output addressing lines Q0-Q4 to the expansion devices 3 for decoding and addressing.

The expansion device 3 comprises built-in standard shared bus with address lines, data lines, control lines and I/O addressing lines between the first connector 31 and the second connector 32, a microprocessor 33, a memory unit 34 connected to the address lines, data lines, control lines of the microprocessor 33, the address lines, data lines, control lines of the standard shared bus for the first connector 31 and the second connector 32 for processing data accessing of the PLC host 2, and a clamping and decoding circuit 35 for acquiring input clamping value of the PLC host 2 or previous expansion device 3 through the input addressing lines I0-I4. The clamping and decoding circuit 35 further receives signals from the address lines A15-A11, the /CS signal of the control lines of the shared bus and the input enable level signal En_in from the expansion device 3 for activating the data accessing communication with the data bus and converting the clamping value for sending to next expansion device 3 through the output addressing lines Q0-Q4.

The expansion device 3 further comprises an IRQ line linked with the IRQ line of other expansion devices 3 and the IRQ line of the PLC host 2 to inform the PLC host 2 and other expansion devices 3 once an interrupt occurs.

The clamping and decoding circuit 35 comprises a clamping circuit 36 and a decoding circuit 37. When the output enable level signal En_out from the PLC host 2 or the expansion devices 3 of previous stage is low level, the clamping and decoding circuit 35 does not work. When the output enable level signal En_out from the PLC host 2 or the expansion devices 3 of previous stage is high level, the clamping and decoding circuit 35 automatically allows or prohibits the PLC host 2 to access the memory unit 34 of the expansion device 3.

As shown in FIG. 7, the clamping circuit 36 comprises a sum circuit 361, a first logic circuit (NAND gate) 362 and a second logic circuit (AND gate) 363. The sum circuit 361 receives an output clamping values from the PLC host 2 or an input clamping value converted from the expansion device 3 of previous stage through input addressing lines I0-I4, the input enable level signal En_in from the PLC host 2. The input clamping value is incremented by one and converted into an output clamping value for outputting to the expansion device 3 of next stage through the output addressing lines Q0-Q4. The input addressing signals I0-I4 are processed by the first logic circuit 362 into the input signal for the second logic circuit 363. The input enable level signal En_in from the PLC host 2 is processed by the second logic circuit 363 into output enable level signal En_out, which is input enable level signal En_in for the expansion device 3 of next stage. When the address lines I0-I4 of the expansion device 3 receives the clamping value of 31 (namely I0~I4=11111) from the output addressing lines Q0-Q4 of the expansion device 3 of previous stage and the input enable level signal En_in is high level, the output enable level signal En_out with low level is output to the expansion device 3 of next stage.

As shown in FIG. 8, the decoding circuit 37 comprises a comparator 371, a third logic circuit (NOR gate) 372 and a fourth logic circuit (OR gate) 373. The comparator 371 receives the output clamping value from the PLC host 2 through the input addressing lines I0-I4 or the output clamping value from the expansion device 3 of previous stage in order to compare with the address signals A15-A11 from the address lines of the shared bus. A low level signal is output when the comparison is matched, and a high level signal is output when the comparison is not matched. The low level or the high level signal is used as input signal for the fourth logic circuit (NOR gate) 373. The other input signal for the fourth logic circuit (NOR gate) 373 is the output of the third logic circuit (NOR gate) 372, which receives a control signal /CS and an inverted input enable level signal En_in. The fourth logic circuit (NOR gate) 373 outputs a level signal /CS_decoder to determine whether the memory unit 34 is connected to activate the data accessing communication for the data line.

In the present invention, the PLC host 2 and the plurality of expansion devices 3 are connected in a serial-connection and parallel-communication manner, which is established by address lines, data lines, control lines I/O addressing lines therebetween. When the output enable level signal En_out output by the PLC host 2 is high level, the plurality of expansion devices 3 use the clamping and decoding circuit 35 thereof and the input addressing to automatically assign the order for each of the expansion devices 3. When PLC host 2 intends to perform data accessing communication to one memory unit 34 of one expansion device 3, the microprocessor 22 of the PLC host 2 sends a high-level output enable level signal En_out to all expansion devices 3 to activate the clamping and decoding circuits 35. Therefore, the PLC host 2 can access one memory unit 34 of one expansion device 3.

In the present invention, the PLC host 2 and the plurality of expansion devices 3 are connected in a serial-connection and parallel-communication manner, which is established by address lines, data lines, control lines I/O addressing lines therebetween. Therefore, the expansion devices 3 can be optionally added in user's disposal and the order of the expansion devices 3 has no limited. The accessible expansion devices 3 depend on the amount of the I/O addressing lines. Therefore, the amount of the expansion devices 3 can be adjusted by changing the amount of the I/O addressing lines. In above-mentioned preferred embodiments, the amount of the I/O addressing lines is 5, therefore, the maximal number of the accessible expansion devices is $2^5=32$.

The clamping and decoding circuits 35 built in the expansion device 3 can automatically assign the order of the expansion devices 3 when the expansion devices 3 are connected together. The clamping and decoding circuit 35 built in the expansion device 3 automatically allows or prohibits the sent or read data of the PLC host 2 according to the clamping values sent from the PLC host or the expansion device 3 of previous stage through the input addressing line I0-I4. In the present invention, the above function is realized by hardware and the microprocessor of the expansion device 3 does not need modification. The accessing time of the PLC host to the expansion device according to the present invention can be reduced in comparison with the prior art PLC host, which relies on the microprocessor of the expansion device 3.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A serial-connection and parallel-communication fast interface, comprising:
   a Programmable Logic-Controller (PLC) host comprising an external connector unit and a first microprocessor; and
   at least one expansion device comprising at least one connector connected to the PLC host and another expansion device;
   wherein the PLC host and the at least one expansion device are connected in a serial-connection and parallel-communication manner, which is established by address lines, data lines, control lines and I/O addressing lines of a shared bus connected between the PLC host and the at least one expansion device; and
   wherein the at least one expansion device automatically assigns the order thereof and automatically allows or prohibits data accessing of the PLC host according to clamping values sent through the I/O addressing lines, and the at least one expansion device further comprises;
   a second microprocessor;
   a memory unit connected to address lines, data lines and control lines of the first microprocessor and address lines, data lines and control lines of the shared bus; and
   a clamping and decoding circuit connected to output addressing lines of the I/O addressing lines to get one clamping value of the at least one expansion device of previous stage and converting the clamping value for sending to the at least one expansion device of next stage through output addressing lines of the I/O addressing lines, the clamping and decoding circuit deciding whether the PLC host is connected to the memory unit and the data lines thereof are activated for date accessing according to the clamping value from input addressing lines,
   wherein the clamping and decoding circuit comprises a clamping circuit and a decoding circuit, and the clamping circuit comprises a sum circuit, a first logic circuit and a second logic circuit, the sum circuit receives the clamping values sent from the output addressing lines of the PLC host or the at least one expansion device of the previous stage and an output enable level signal from the PLC host to output another clamping value to the at least one expansion device of the next stage, the signals of the input addressing lines are processed by the first logic circuit to form input signal of the second logic circuit, the output of the PLC host or the input enable level signal of the at least one expansion device of the previous stage is processed by the second logic circuit to generate another output enable level signal which is an input enable level signal for the at least one expansion device of the next stage.

2. The serial-connection and parallel-communication fast interface as in claim 1, wherein the shared bus is built in the PLC host and the first microprocessor connected to the address lines, data lines and control lines of the shared bus, and the PLC host further comprises;
   an initial address output circuit connected to the I/O addressing lines for outputting the clamping value to the at least one expansion device.

3. The serial-connection and parallel-communication fast interface as in claim 2, wherein the PLC host further comprises an output enable level signal connected to the at least and expansion device.

4. The serial-connection and parallel-communication fast interface as in claim 2, wherein the PLC host further comprises an Interrupt Request (IRQ) signal output.

5. The serial-connection and parallel-communication fast interface as in claim 2, wherein an amount of output addressing lines can be adjusted according to a maximal number of the expansion devices.

6. The serial-connection and parallel-communication fast interface as in claim 1, wherein the at least one expansion device further comprises an Interrupt Request (IRQ) output to inform the PLC host during an interrupt.

7. The serial-connection and parallel-communication fast interface as in claim 1, wherein the first logic circuit is a NAND gate.

8. The serial-connection and parallel-communication fast interface as in claim 1, wherein the second logic circuit is an AND gate.

9. The serial-connection and parallel-communication fast interface as in claim 1, wherein the decoding circuit comprises a comparator, a third logic circuit and a fourth logic circuit, the comparator receives output addressing lines from the PLC host or the input addressing lines converted by the at least one expansion device of previous stage to compare with address signal output by address lines of the shared bus to output a level signal as an input signal of the fourth logic circuit, the third logic circuit generates another input signal of the fourth logic circuit according to inversed input enable level signal of the PLC host and a control signal from the control line of the shared bus, the fourth logic circuit output a level signal to determine whether the memory unit is connected to data accessing communication through the data line.

10. The serial-connection and parallel-communication fast interface as in claim 9, wherein the third logic circuit is a NOR gate.

11. The serial-connection and parallel-communication fast interface as in claim 9, wherein the fourth logic circuit is an OR gate.

12. The serial-connection and parallel-communication fast interface as in claim 1, wherein the connector unit of the PLC host is one of female connector unit and male connector unit.

13. The serial-connection and parallel-communication fast interface as in claim 1, wherein the at least one expansion device comprises a first connector and a second connector, the first connector is for connecting to the connector unit of the PLC host, and the second connector is for connecting to the first connector.

* * * * *